(12) United States Patent
Sajassi et al.

(10) Patent No.: US 8,194,656 B2
(45) Date of Patent: Jun. 5, 2012

(54) METRO ETHERNET NETWORK WITH SCALED BROADCAST AND SERVICE INSTANCE DOMAINS

(75) Inventors: Ali Sajassi, San Ramon, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1229 days.

(21) Appl. No.: 11/117,016

(22) Filed: Apr. 28, 2005

(65) Prior Publication Data

US 2006/0245438 A1     Nov. 2, 2006

(51) Int. Cl.
*H04L 12/28* (2006.01)
(52) U.S. Cl. .................. 370/389; 370/392; 370/401
(58) Field of Classification Search .................. None
See application file for complete search history.

(56) References Cited

U.S. PATENT DOCUMENTS

| | | | |
|---|---|---|---|
| 5,331,637 A | 7/1994 | Francis et al. |
| 5,818,842 A | 10/1998 | Burwell et al. |
| 5,848,227 A | 12/1998 | Sheu |
| 6,055,364 A | 4/2000 | Speakman et al. |
| 6,073,176 A | 6/2000 | Baindur et al. |
| 6,078,590 A | 6/2000 | Farinacci et al. |
| 6,188,694 B1 | 2/2001 | Fine et al. |
| 6,301,244 B1 | 10/2001 | Huang et al. |
| 6,304,575 B1 | 10/2001 | Carroll et al. |
| 6,308,282 B1 | 10/2001 | Huang |
| 6,373,838 B1 | 4/2002 | Law et al. |
| 6,424,657 B1 | 7/2002 | Voit et al. |
| 6,470,025 B1 | 10/2002 | Wilson et al. |
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |

(Continued)

FOREIGN PATENT DOCUMENTS

WO    WO 03/005648    1/2003

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner* — Nittaya Juntima
*Assistant Examiner* — Tito Pham
(74) *Attorney, Agent, or Firm* — Baker Botts L.L.P.

(57) ABSTRACT

A method of operation for a provider edge device of a core network includes receiving a customer frame from an access network; the customer frame having a first Virtual Local Area Network (VLAN) tag of a first predetermined bit length. The first VLAN tag including a service instance identifier. The service instance identifier of the first VLAN tag is then mapped into a second VLAN tag of a second predetermined bit length greater than the first predetermined bit length.

7 Claims, 9 Drawing Sheets

U.S. PATENT DOCUMENTS

| | | | |
|---|---|---|---|
| 6,785,232 B1 | 8/2004 | Kotser et al. | |
| 6,785,265 B2 | 8/2004 | White et al. | |
| 6,789,121 B2 * | 9/2004 | Lamberton et al. | 709/227 |
| 6,798,775 B1 | 9/2004 | Bordonaro et al. | |
| 6,801,533 B1 | 10/2004 | Barkley | |
| 6,826,698 B1 | 11/2004 | Minkin et al. | |
| 6,829,252 B1 | 12/2004 | Lewin et al. | |
| 6,850,542 B2 | 2/2005 | Tzeng | |
| 6,852,542 B2 | 2/2005 | Mandel et al. | |
| 6,879,594 B1 | 4/2005 | Lee et al. | |
| 6,882,643 B1 | 4/2005 | Mauger et al. | |
| 6,892,309 B2 | 5/2005 | Richmond et al. | |
| 6,954,436 B1 | 10/2005 | Yip et al. | |
| 7,009,983 B2 | 3/2006 | Mancour | |
| 7,016,351 B1 | 3/2006 | Farinacci et al. | |
| 7,047,304 B2 | 5/2006 | Senapati et al. | |
| 7,092,389 B2 * | 8/2006 | Chase et al. | 370/389 |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,277,936 B2 | 10/2007 | Frietsch | |
| 7,310,342 B2 | 12/2007 | Rouleau | |
| 7,315,554 B2 | 1/2008 | Baum et al. | |
| 7,339,929 B2 | 3/2008 | Zelig et al. | |
| 7,345,991 B1 | 3/2008 | Shabtay et al. | |
| 7,408,936 B2 * | 8/2008 | Ge et al. | 370/392 |
| 7,466,703 B1 | 12/2008 | Arunachalam et al. | |
| 7,519,056 B2 * | 4/2009 | Ishwar et al. | 370/389 |
| 7,693,078 B2 | 4/2010 | Gonda | |
| 7,698,456 B2 | 4/2010 | Guichard et al. | |
| 7,701,936 B2 | 4/2010 | Hongal et al. | |
| 7,843,917 B2 | 11/2010 | Brockners et al. | |
| 2002/0032780 A1 | 3/2002 | Moore et al. | |
| 2002/0087721 A1 * | 7/2002 | Sato et al. | 709/238 |
| 2002/0156612 A1 | 10/2002 | Schulter et al. | |
| 2002/0156919 A1 | 10/2002 | Maeno | |
| 2002/0196795 A1 | 12/2002 | Higashiyama | |
| 2003/0012183 A1 | 1/2003 | Butler et al. | |
| 2003/0036375 A1 | 2/2003 | Chen et al. | |
| 2003/0101243 A1 | 5/2003 | Donahue et al. | |
| 2003/0110268 A1 | 6/2003 | Kermarec et al. | |
| 2003/0112781 A1 | 6/2003 | Kermode et al. | |
| 2003/0142674 A1 | 7/2003 | Casey | |
| 2003/0154259 A1 | 8/2003 | Lamberton et al. | |
| 2003/0177221 A1 | 9/2003 | Ould-Brahim et al. | |
| 2004/0078469 A1 * | 4/2004 | Ishwar et al. | 709/227 |
| 2004/0081171 A1 * | 4/2004 | Finn | 370/395.53 |
| 2004/0095940 A1 | 5/2004 | Yuan et al. | |
| 2004/0102182 A1 | 5/2004 | Reith et al. | |
| 2004/0107382 A1 | 6/2004 | Doverspike et al. | |
| 2004/0125809 A1 | 7/2004 | Jeng | |
| 2004/0133619 A1 | 7/2004 | Zelig et al. | |
| 2004/0141501 A1 | 7/2004 | Adams et al. | |
| 2004/0151180 A1 | 8/2004 | Hu et al. | |
| 2004/0158735 A1 | 8/2004 | Roese | |
| 2004/0165525 A1 | 8/2004 | Burak | |
| 2004/0165600 A1 | 8/2004 | Lee | |
| 2004/0172559 A1 | 9/2004 | Luo et al. | |
| 2004/0213201 A1 | 10/2004 | Osterlund | |
| 2004/0228291 A1 | 11/2004 | Huslak et al. | |
| 2004/0230444 A1 | 11/2004 | Holt et al. | |
| 2004/0233891 A1 | 11/2004 | Regan et al. | |
| 2004/0264364 A1 | 12/2004 | Sato | |
| 2005/0007951 A1 | 1/2005 | Lapuh et al. | |
| 2005/0025143 A1 * | 2/2005 | Chen et al. | 370/389 |
| 2005/0030975 A1 | 2/2005 | Wright et al. | |
| 2005/0044265 A1 | 2/2005 | Vinel et al. | |
| 2005/0063397 A1 | 3/2005 | Wu et al. | |
| 2005/0068972 A1 | 3/2005 | Burns et al. | |
| 2005/0089047 A1 | 4/2005 | Ould-Brahim et al. | |
| 2005/0099949 A1 | 5/2005 | Mohan et al. | |
| 2005/0152370 A1 | 7/2005 | Meehan et al. | |
| 2005/0157664 A1 | 7/2005 | Baum et al. | |
| 2005/0157751 A1 | 7/2005 | Rabie et al. | |
| 2005/0160180 A1 * | 7/2005 | Rabje et al. | 709/238 |
| 2005/0163049 A1 | 7/2005 | Yazaki et al. | |
| 2005/0175022 A1 * | 8/2005 | Nishimura et al. | 370/401 |
| 2005/0190773 A1 * | 9/2005 | Yang et al. | 370/395.53 |
| 2005/0193385 A1 | 9/2005 | Heer et al. | |
| 2005/0239445 A1 | 10/2005 | Karaoguz et al. | |
| 2005/0249124 A1 | 11/2005 | Elie-Dit-Cosaque et al. | |
| 2005/0265329 A1 * | 12/2005 | Havala et al. | 370/389 |
| 2005/0286503 A1 | 12/2005 | Oda et al. | |
| 2006/0007867 A1 | 1/2006 | Elie-Dit-Cosaque et al. | |
| 2006/0092847 A1 | 5/2006 | Mohan | |
| 2006/0098607 A1 | 5/2006 | Zeng et al. | |
| 2006/0109802 A1 | 5/2006 | Zelig et al. | |
| 2006/0126496 A1 | 6/2006 | Filsfils et al. | |
| 2006/0182037 A1 | 8/2006 | Chen et al. | |
| 2006/0198323 A1 | 9/2006 | Finn | |
| 2006/0248227 A1 * | 11/2006 | Hato et al. | 709/245 |
| 2006/0262794 A1 | 11/2006 | Livet et al. | |
| 2006/0285500 A1 | 12/2006 | Booth et al. | |
| 2006/0285501 A1 | 12/2006 | Damm | |
| 2007/0076719 A1 | 4/2007 | Allan et al. | |
| 2007/0133564 A1 | 6/2007 | Chun et al. | |
| 2007/0274321 A1 * | 11/2007 | Jonsson et al. | 370/395.53 |
| 2008/0062999 A1 | 3/2008 | Platnic | |
| 2008/0144657 A1 | 6/2008 | Li | |
| 2008/0172497 A1 | 7/2008 | Mohan et al. | |
| 2009/0019469 A1 | 1/2009 | Foti et al. | |
| 2009/0129386 A1 | 5/2009 | Rune | |

FOREIGN PATENT DOCUMENTS

| | | |
|---|---|---|
| WO | WO 2005/034441 | 4/2005 |
| WO | WO 2007/031002 A | 3/2007 |
| WO | WO 2008/089370 | 7/2008 |

OTHER PUBLICATIONS

Do-Wire Edge-To Edge (PWE3) Working Group, Simon Delord, UECOMM; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, Ch, No. 2, Oct. 1, 2005, XP015042128 ISSN: 0000-0004 abstract p. 10, paragraph 2 Section 3.1.1.1. on pp. 12-13 http://ftp.ist.utl.pt/pub/drafts/draft-delord-pwe3-oam-applications-02.txt.

Blunk et al. Draft RFC 2284—Extensible Authentication Protocol EAP, Feb. 2004; http://tools.ietf.org/html/draft-ietf-eap-rfc2284bis-09.

Light Reading, Inc., Distributed-Edge Artecture, Nov. 25, 2003.

Landron, Use of the IEEE Assigned Type Field with IEEE std 802.3, 1998 Edition Local and Metropolian Area Networks, Apr. 16, 2004.

Marc Lasserre et al., "Virtual Private LAN Services over MPLS", Mar. 2003, Internet Draft Document, pp. 4-22.

Wolfe, [dhcwg] Publication of draft-droms-agentopt-8021x-00.txt, Nov. 22, 2001, IETF.

Cisco, Delivering Multicast Vidoe over Asymmetric Digital Subscriber Line, 1999, Cisco.

Flannagan et al., Cisco Catalyst QoS; Quality of Service in Campus Networks, Jun. 6, 2003, Cisco Press, chapter 8, section 4.

Chiruvolu et al., "Issues and Approaches on Extending Ethernet Beyond LANs", Ieee Communications Magazine, Mar. 2004, p. 80-86.

* cited by examiner

METRO ETHERNET NETWORK WITH SCALED BROADCAST AND SERVICE INSTANCE DOMAINS

RELATED APPLICATIONS

The present application is related to co-pending application Ser. Nos. 11/117,017 filed Apr. 28, 2005, entitled, "System And Method For DSL Subscriber Identification Over Ethernet Network"; 11/117,250 filed Apr. 28, 2005, entitled, "A Comprehensive Model For VPLS"; and 11/117,249 filed Apr. 28, 2005, entitled, "Scalable System And Method For DSL Subscriber Traffic Over An Ethernet Network", which applications are assigned to the assignee of the present application.

FIELD OF THE INVENTION

The present invention relates generally to digital computer network technology; more particularly, to methods and apparatus for providing metro Ethernet services.

BACKGROUND OF THE INVENTION

Ethernet originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached. Examples of network switches for use in Ethernet network environments are found in U.S. Pat. Nos. 6,850,542, 6,813,268 and 6,850,521.

The IEEE 802.1Q specification defines a standard for Virtual Local Area Network (VLAN). Broadcast and multicast frames are constrained by VLAN boundaries such that only devices whose ports are members of the same VLAN see those frames. Since 802.1Q VLANS typically span many bridges across area common network, identification of VLANs is achieved by inserting a tag into the Ethernet frame. For example, according to the existing standard, a 12-bit tag that uniquely identifies a VLAN may be inserted into an Ethernet frame. This VLAN tag may be used to specify the broadcast domain and to identify the customer associated with a particular VLAN. The customer identifier is commonly referred to as the service instance domain since it identifies the service provided for a particular customer. In a service provider (SP) metro Ethernet network, the broadcast domain constrains the scope of traffic among network devices such that data packets are not multicast to all devices connected to the network. A system and method for efficiently distributing multicast messages within computer networks configured to have one or more VLAN domains is disclosed in U.S. Pat. No. 6,839,348.

The concept of a broadcast and a service instance domains is illustrated in FIG. 1, which shows a SP Metro Ethernet network 10 that includes a plurality of interconnected switches. Three provider edge (PE) devices located on the periphery of network 10 connect with two different customers, respectively represented by customer edge (CE) devices labeled $CE_1$ and $CE_2$. The broadcast domain (i.e., $CE_1$) is shown by the bold, heavy line, which defines the particular switches and the path or span through the switches for traffic sent among the various customer sites. The service instance defines the particular customer associated with a given data packet, e.g., the customer of the $CE_1$ sites as distinguished from the customer associated with devices $CE_2$. Note that in the example of FIG. 1, both customers use the same broadcast domain. Traffic associated with a particular customer is uniquely identified by the service instance tag identifier.

FIG. 2 shows two data packet formats commonly used for sending frames over a Metro Ethernet network. Data packet format 11 complies with the IEEE 802.1Q specification and includes a customer MAC address field followed by a 12-bit VLAN tag that is used to specify both the broadcast domain and service instance. The customer's data payload is shown beneath the VLAN tag. (The uppermost portion of the data packet is also frequently referred to as the "outermost" portion, with the lowermost being synonymously referred to as the "innermost" portion.) The 12-bit VLAN tag field means that the IEEE 802.1 Q standard can support a combined total of up to 4,094 broadcast domains and service instance domains. For instance, the IEEE 802.1Q standard can support 4,094 broadcast domains, each corresponding to a single service instance domain or a single broadcast domain with 4,094 service instance domains. By way of further example, U.S. Pat. No. 6,430,621 teaches a method and apparatus that provides for grouping nodes in multiple VLANs using port-based VLAN grouping using IEEE 802.1Q based frame tagging.

Data packet format 12 corresponds to the proposed IEEE 802.1 ad specification that supports so-called "Q-in-Q" encapsulation, or tag stacking mechanism. According to this draft standard, each data packet includes an upper (i.e., outer) 12-bit tag that designates one of up to 4,094 broadcast domains (or VLANs), and a lower (i.e., inner) tag that identifies one of up to 4,094 service instances. The proposed IEEE 802.1 ad standard thus alleviates some of the capacity limitations inherent in the IEEE 802.1Q standard by permitting each broadcast domain (each VLAN) to include up to 4,094 service instances. However, although the 802.1 ad draft standard is capable of satisfying many multipoint applications, it remains inadequate for point-to-point applications where a single device can multiplex/de-multiplex tens of thousands or hundreds of thousands of service instances within a single broadcast domain. Furthermore, the number of broadcast domains in Metro Area Network (MAN)/WAN applications can easily exceed the 4K limit. In addition, there are certain applications that require the end-user MAC addresses and/or the end-user's Frame Check Sum (FCS) to be tunneled through the MAN/WAN Ethernet network, a feature which is unsupported by the 802.1ad proposal.

Nortel Networks Corporation has proposed an approach known as "MAC-in-MAC" that attempts to solve the drawbacks inherent in the prior art. The Nortel proposal, however, is based on a flat VLAN domain (i.e., no VLAN tag stacking) and has a number of disadvantages. First, the MAC-in-MAC approach does not differentiate between broadcast domains and service instance domains; therefore, if the number of service instances is substantially larger than the required number of broadcast domains, the network nodes (i.e., switches, bridges, routers, etc.) will be burdened with supporting as many broadcast domains as there are service instances. Since more hardware/software intensive resources are needed to support a broadcast domain than a service instance, bandwidth suffers and network costs increase. Additionally, the MAC-in-MAC approach lacks inter-operability with 802.1 ad bridges; lacks a feasible implementation capable of supporting millions of broadcast domains; and requires that all bridges within the network have the MAC-in-MAC capability, not just the edge bridges.

By way of further background, U.S. Pat. No. 6,789,121 discloses a method of providing a Virtual Private Network (VPN) service through a shared network infrastructure comprising interconnected PE devices having CE interfaces. Some of the CE interfaces are allocated to a VPN supporting a plurality of VLANs and are arranged for exchanging traffic data units with respective CE devices, each traffic data unit including a VLAN identifier. A virtual connection (VC) in the shared network infrastructure is directly derived from a known VPN identifier and a VLAN identifier known or discovered by a PE device. U.S. Pat. No. 6,484,209 teaches a system configured to forward multicast data based upon a first set of correlation data, wherein a first set of correlation data maps multicast group identifiers to ports that are members of the corresponding multicast groups. The switch core includes a second set of correlation data which maps multicast group identifiers to I/O cards that include member ports.

Thus, there is a need for alternative methods and apparatus that would accommodate the ever expanding number of broadcast domains and service instances of MAN/WAN Ethernet Networks while overcoming the shortcomings of past approaches.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

An extended VLAN (E-VLAN) mechanism that can differentiate between broadcast domains and service instance domains, and expands the number of broadcast domains and service instance domains in Ethernet MAN/WAN applications is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 10:
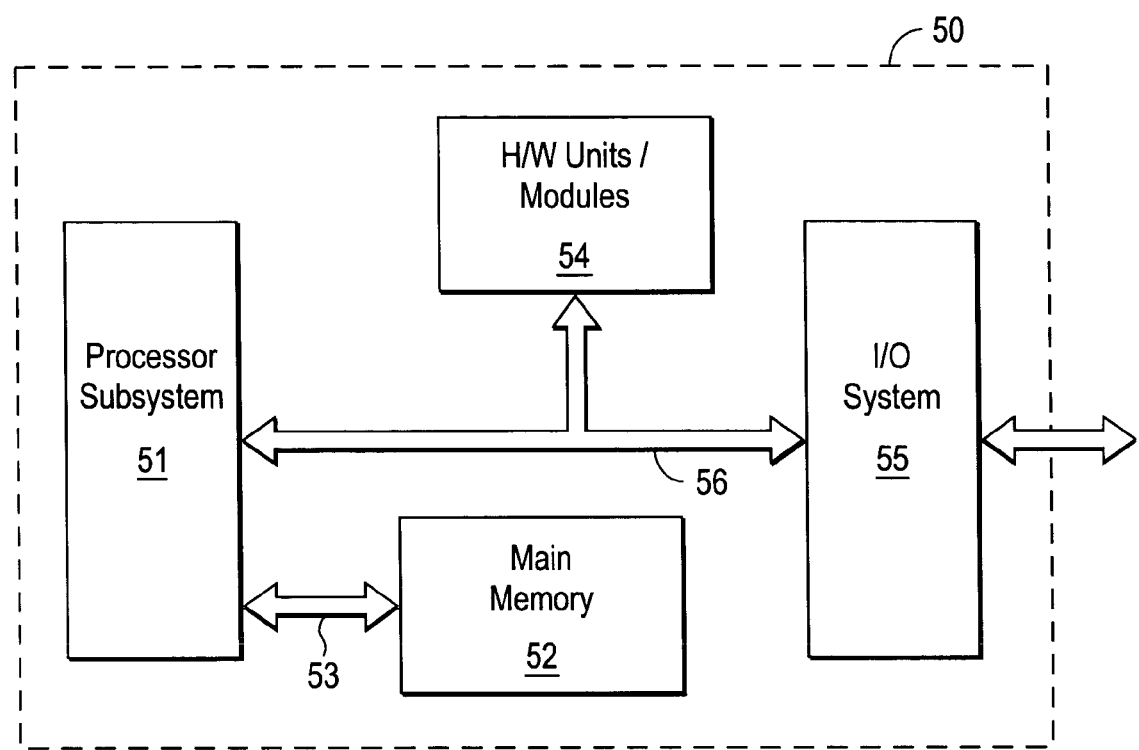
FIG. 10 is a generalized circuit schematic block diagram of a network node.

As shown in FIG. 10, each node 50 typically comprises a number of basic subsystems including a processor subsystem 51, a main memory 52 and an input/output (I/O) subsystem 55. Data is transferred between the main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component interconnect (PCI) bus. Node 50 may also comprise other hardware (H/W) units/modules 54 coupled to system bus 56 for performing additional functions. Processor subsystem 51 may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 1:
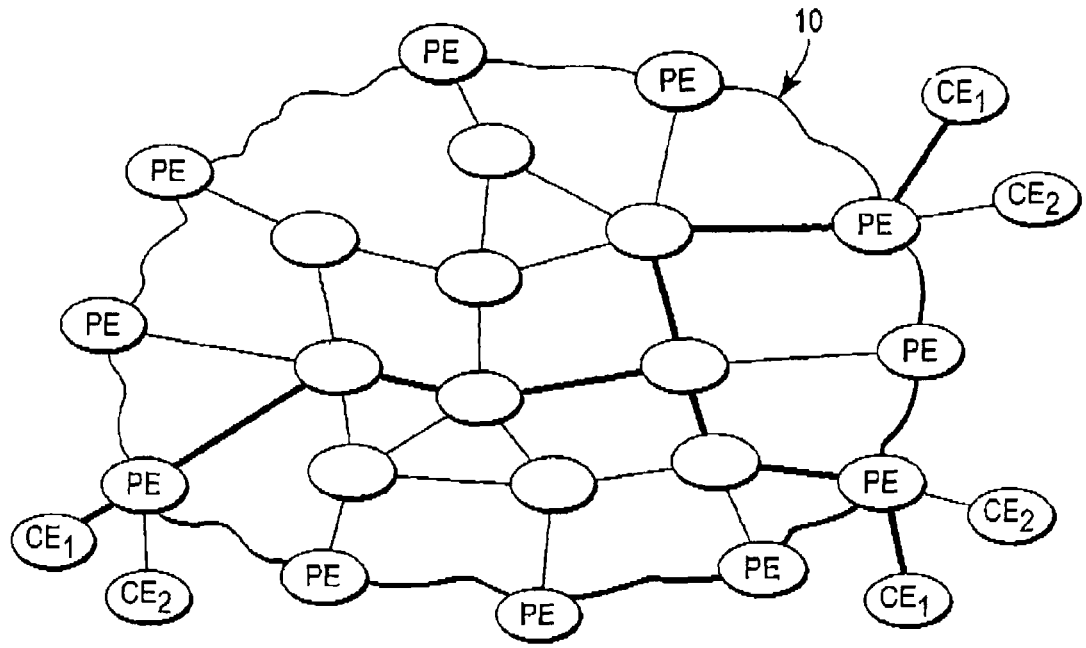
FIG. 1 is diagram of a service provider network used to interconnect plurality of customer sites.
Figure 2:
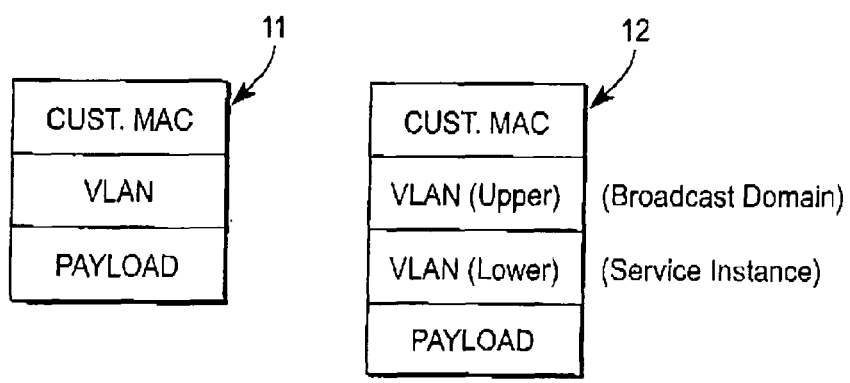
FIG. 2 illustrates two different prior art data packet formats.
Figure 3:
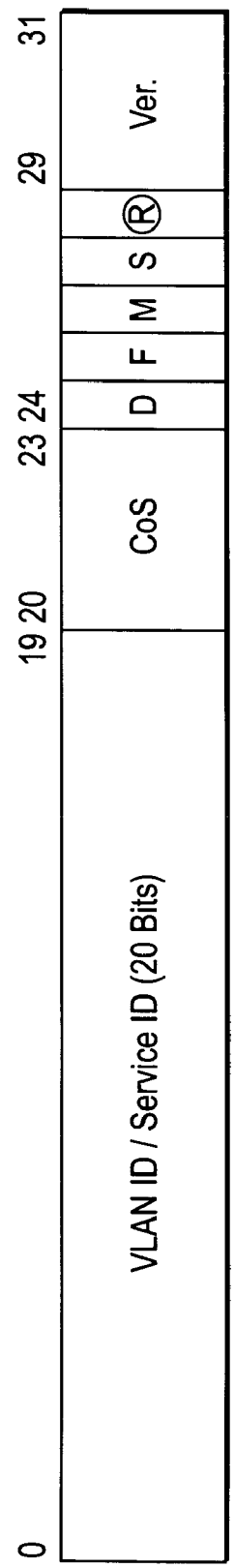
FIG. 3 shows one embodiment of the extended VLAN format of the present invention.

FIG. 3 shows the E-VLAN tag format in accordance with one embodiment of the present invention. An Ethertype associated with the E-VLAN may be used to identify this extended tag in an Ethernet frame. A key feature of the E-VLAN tag format is a 20-bit VLAN ID/Service ID field that allows identification, in certain applications, of up to one million different service instances. Also included is a 4-bit Class of Service (CoS) field, a Discard eligible (D) bit, a FCS (F) bit, a customer MAC address encapsulation (M) bit, and a stack (S) bit that indicates that VLAN stacking is utilized in the data packet format. Setting of the M bit indicates the entire customer frame, including the customer's MAC address, is encapsulated in the Ethernet frame. In cases where the M bit is set, the provider MAC address is used for tunneling through the SP network. These latter two features will be discussed in more detail below.

As will become apparent shortly, the E-VLAN tag mechanism can be used in many different applications. For instance, when the E-VLAN tag is utilized as a service instance identifier, the E-VLAN tag may be embedded within an IEEE 802.1ad frame, replacing the inner tag normally associated with an 802.1ad frame. In such applications, there can be 4,094 broadcast domains, with each broadcast domain supporting up to one million service instances. In applications where a given service instance requires its own broadcast domain (i.e., one-to-one correspondence) a single E-VLAN tag may be utilized as both the broadcast domain identifier and the service instance identifier. In such applications, the E-VLAN tag is the only tag in the Ethernet frame.

In still other cases, two E-VLAN tags may be utilized (i.e., one as the broadcast domain and the other one as service instance domain identifiers). In such applications, the E-VLAN tag is nested such that the outer tag represents the broadcast domain and the inner tag represents the service instance. Examples of these types of applications include situations where there are tens of thousands of broadcast domains, where each broadcast domain has up to one million service instances. Note that in applications where the E-VLAN tag is nested, a single Ethertype may be used, and the S bit will be set to indicate tag stacking.

The extended E-VLAN tag of the present invention can also be used to indicate if the Ethernet frame contains end-user's FCS, for applications where FCS retention is required, as well as to identify when the Ethernet frame contains the end-user's MAC addresses, for applications where MAC tunneling is required.

Figure 4:
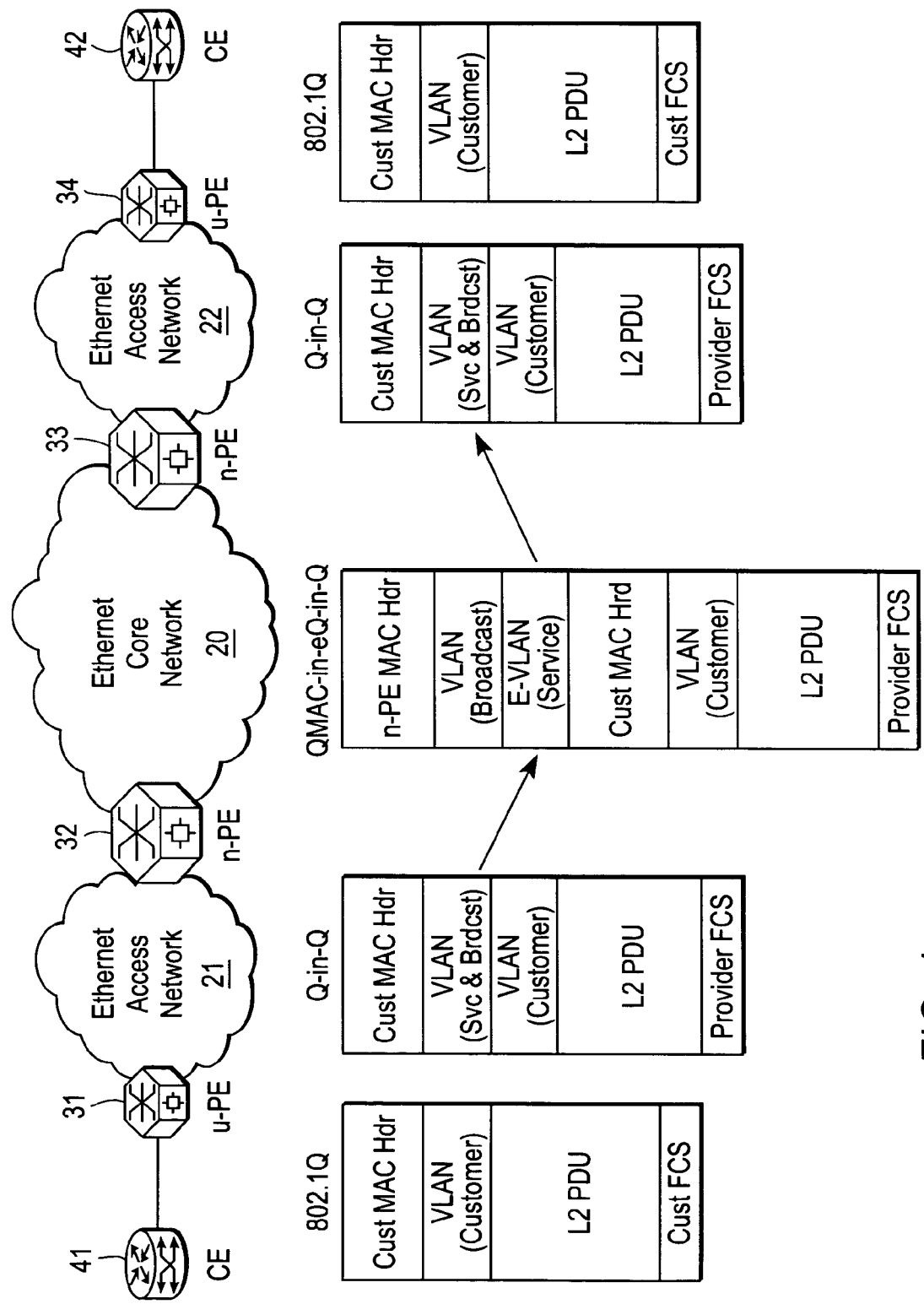
FIG. 4 illustrates the use of the extended VLAN mechanism as a service instance identifier according to one embodiment of the present invention.

FIG. 4 illustrates use of the extended VLAN mechanism as a service instance identifier across an Ethernet Service provider network in accordance with one embodiment of the present invention. The service provider network of FIG. 4 includes an Ethernet core network 20 that is shown connected to a pair of Ethernet access networks 21 & 22 via network provider edge (n-PE) devices 32 & 33, respectively. User-facing provider edge (u-PE) devices 31 & 34 connect respective customer edge (CE) devices 41 & 42 to Ethernet access networks 21 & 22. Data packet format diagrams are shown under each corresponding network connection extending between CE devices 41 and 42.

According to the embodiment of FIG. 4, a customer frame sent by CE device 41 arrives at u-PE device 31 with a data packet format consistent with the IEEE 802.1Q specification, which format includes a customer MAC header, a customer VLAN tag, a Layer 2 protocol data unit (L2PDU) customer payload, and a customer FCS. In this example, access network 21 is a Q-in-Q network such that, when the customer frame arrives, u-PE device 31 adds another 12-bit VLAN tag that identifies the service instance and broadcast domain for connections across network 21. When the data packet arrives at the edge of core network 20, n-PE device 32 appends the data packet by taking the service instance identifier received from u-PE device 31 and mapping it to an E-VLAN (20-bit) tag. A separate VLAN tag may also be added on top of the E-VLAN at this point to specify the broadcast domain spanning core network 20. (Practitioners in the networking arts will understand that the broadcast domain through core network 20 is separate and distinct from the broadcast domains of access networks 21 and 22.)

Traffic traversing the right-hand side of the diagram of FIG. 4 (from core network 20 to CE device 42) follows the reverse process. That is, n-PE device 33 strips the VLAN (broadcast) and E-VLAN (service) tags from the received data packets; mapping the 20-bit E-VLAN service instance identifier to a 12-bit VLAN that specifies the broadcast domain and service instance domain for access network 22. Similarly, u-PE device 34 strips the VLAN (broadcast & service) from the Q-in-Q data packet before forwarding to CE device 42.

It is appreciated that each of the u-PE and n-PE devices shown in the embodiment of FIG. 4 are configured to both append frames (adding the appropriate tags) headed in the direction from the CE device toward core network 20, and to strip frames (removing the appropriate tags) headed in the direction from core network 20 to the CE device. In other words, the switches at the edge of the core and access networks are capable of handling both ingress and egress data traffic in the manner described above. By way of example, processing of the frames to add/drop tag fields may be performed by a software routine running on the central processing unit (CPU) associated with the corresponding provider edge device.

Note that in the embodiment shown in FIG. 4, data packets in the Ethernet core network 20 include a SP MAC header added by the n-PE device which encapsulates the customer MAC address. Encapsulation of MAC addresses in this manner is known as MAC tunneling, and provides a mechanism for insuring that the customer's MAC addresses are not learned (i.e., they remain invisible) in all switches within core network 20. Practitioners in the networking arts will appreciate that the embodiment of FIG. 4 is useful in applications that rely upon devices in core network 20 that are limited to operating on a 12-bit tag. The core switches will only see the upper tag, with the lower tag, i.e., the E-VLAN tag (service), being processed by n-PE devices only.

Figure 5:
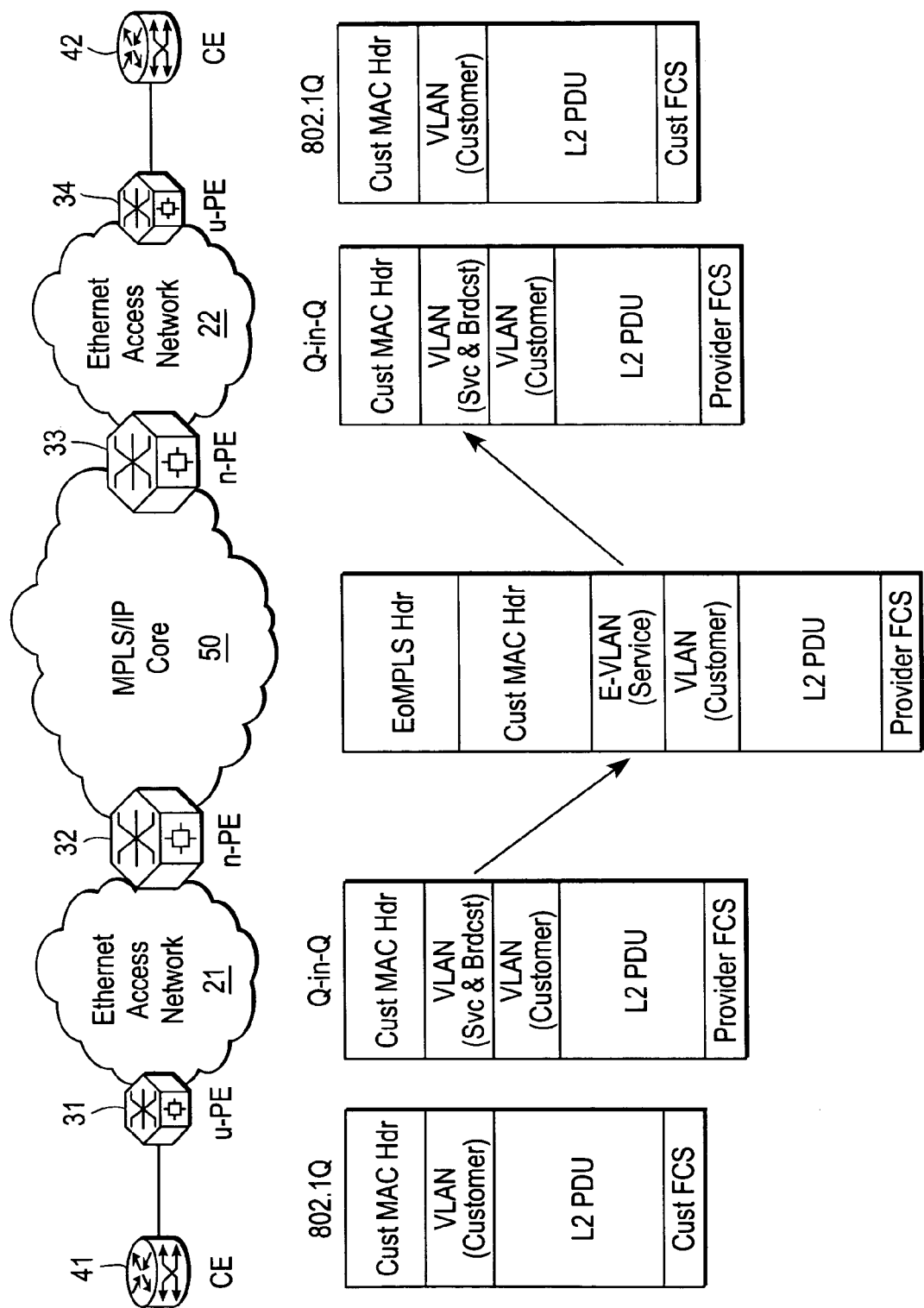
FIG. 5 illustrates the use of the extended VLAN mechanism as a service instance identifier according to another embodiment of the present invention.

The embodiment of FIG. 5 is similar to that shown in FIG. 4, but without MAC tunneling in the core. Instead of an Ethernet core network, FIG. 5 shows how the E-VLAN tag of the present invention may be used across a Multi-protocol label switching (MPLS)/Internet Protocol (IP) core network 50. Because the core is MPLS/IP, the customer's MAC addresses are not visible in the SP core network. In this example, on the ingress side n-PE device 32 operates to map the service instance identifier of the 12-bit VLAN tag of access network 21 to a 20-bit E-VLAN tag identifying the service instance for connections across core 50. On the egress side, n-PE device 33 maps the 20-bit E-VLAN tag back down to a 12-bit VLAN that identifies both the broadcast domain and service domain for access network 22. As can be seen, the core data packets also include an Ethernet over MPLS (EoMPLS) header for IP encapsulation across core network 50.

Figure 6:
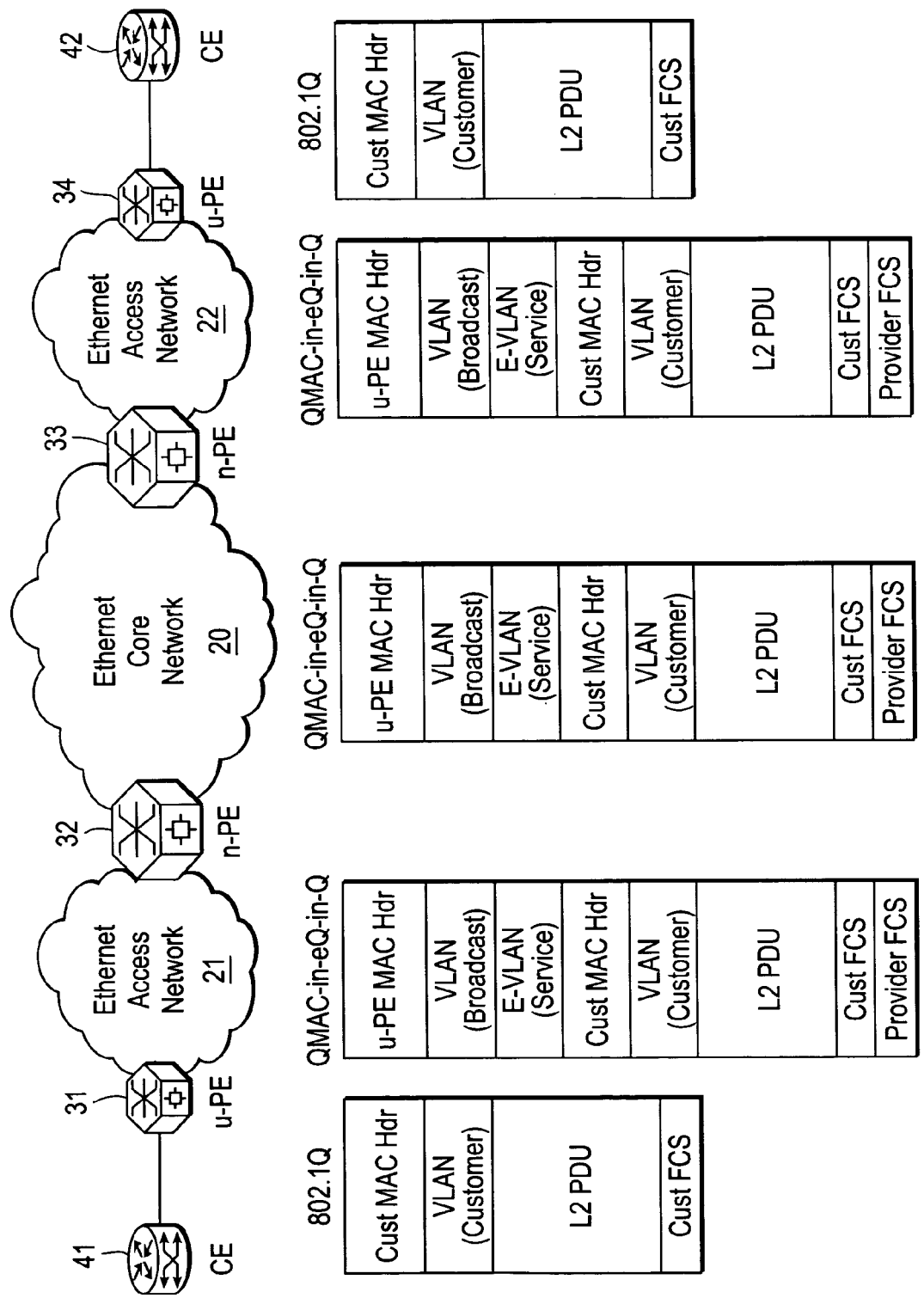
FIG. 6 illustrates the use of the extended VLAN mechanism as a service instance identifier according to still another embodiment of the present invention.

Turning now to FIG. 6, use of the E-VLAN mechanism according to another embodiment of the present invention is shown. In this embodiment, encapsulation of the customer's MAC address and generation of the E-VLAN tags occurs in access networks, i.e., at the u-PE device rather than at the n-PE devices of core network 20. In other words, the E-VLAN tag is again used as a 20-bit service instance identifier, but instead of performing the operations of adding and dropping the E-VLAN tags at n-PE devices 32 & 33, those operations are performed by u-PE devices 31 & 34. In other words, in the example of FIG. 6, u-PE device 31 adds the service instance E-VLAN and broadcast domain VLAN tags to each of the customer's frames prior to forwarding them across access network 21. Note that the customer frame is also encapsulated inside of the u-PE MAC header.

The E-VLAN tag remains unchanged through core network 20 and access network 22. However, it is appreciated that the VLAN tag designating the broadcast domain in access network 21 differs from the broadcast domain VLAN tag in core network 20, which also differs from the VLAN designating the broadcast domain in access network 22. That is, the only thing that n-PE devices 32 & 33 change in the data packets is the upper VLAN tag that defines the scope of the broadcast domain.

Figure 7:
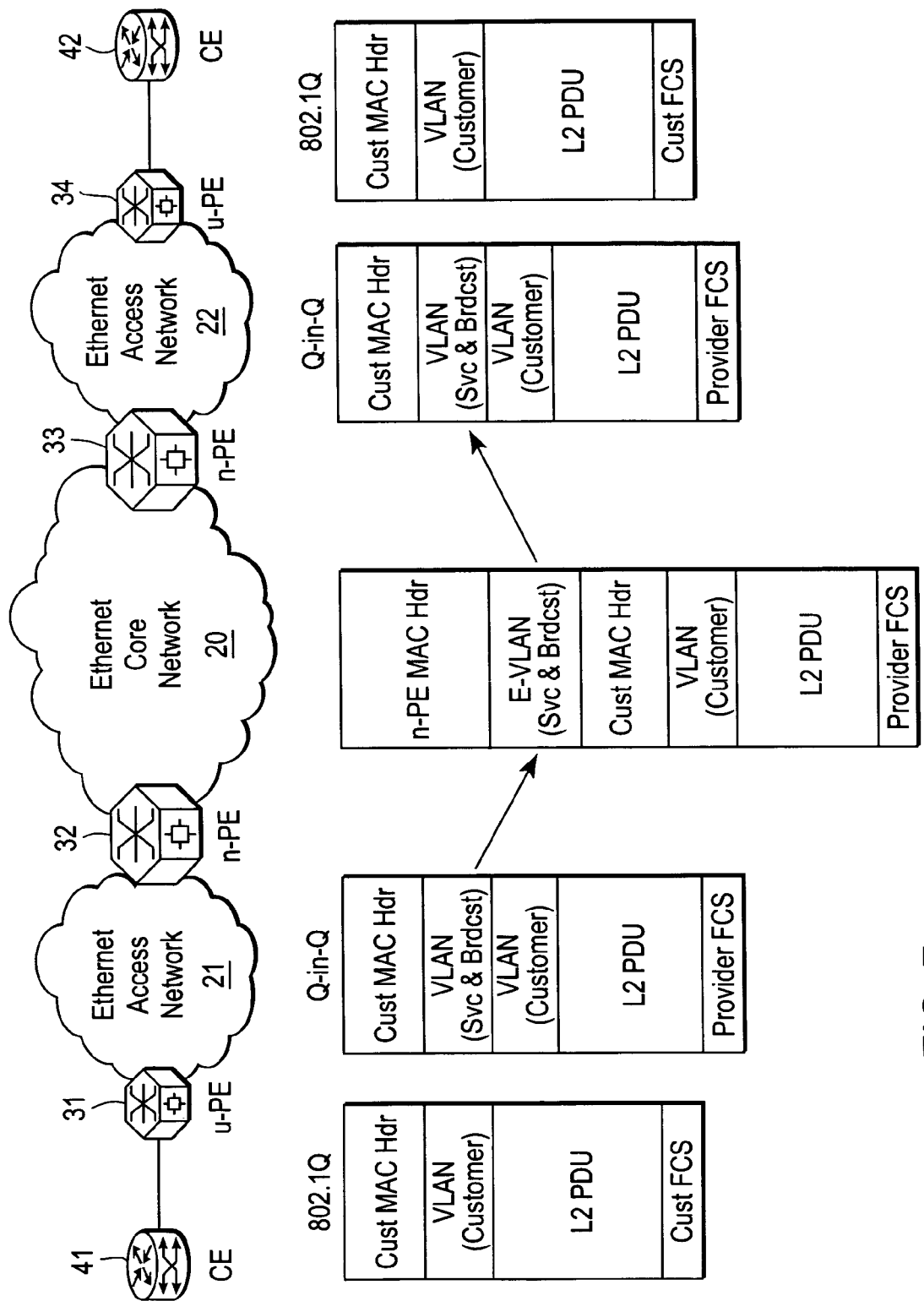
FIG. 7 illustrates the use of the extended VLAN mechanism as both a broadcast domain identifier and a service instance identifier according to one embodiment of the present invention.

FIG. 7 illustrates the use of the extended VLAN mechanism as both a broadcast domain identifier and a service instance identifier according to another embodiment of the present invention. Whereas in the previous examples, the E-VLAN tag is used to identify the service instance domain (i.e., the customer), in the example of FIG. 7, the E-VLAN tag designates both the broadcast domain and the service instance domain through Ethernet core network 20. The embodiment of FIG. 7 is therefore similar to that shown in FIG. 4, but without the additional VLAN (broadcast) added by n-PE device 32 in the core.

Figure 8:
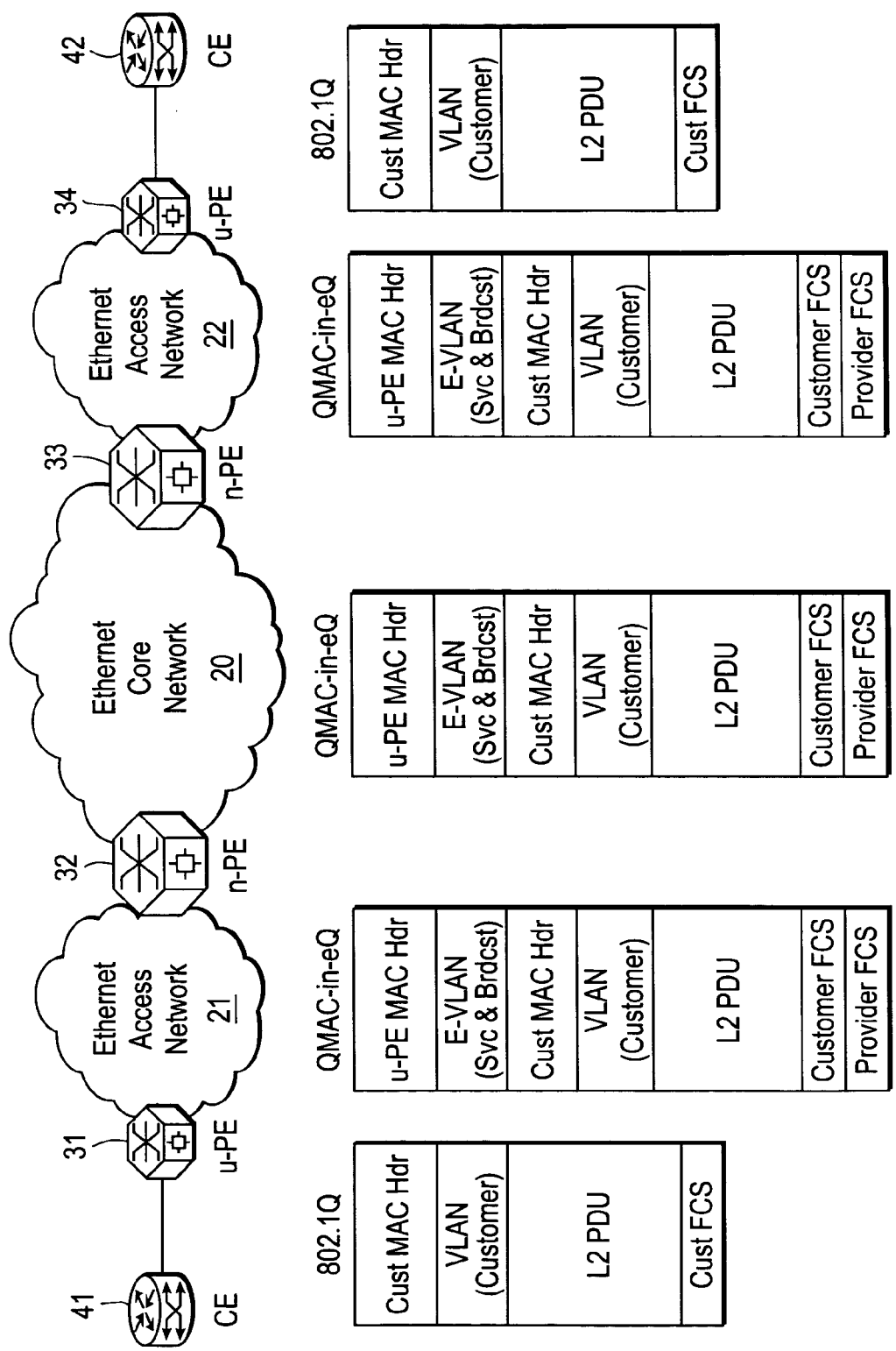
FIG. 8 illustrates the use of the extended VLAN mechanism as both a broadcast domain identifier and a service instance identifier according to another embodiment of the present invention.

FIG. 8 illustrates the use of the extended VLAN mechanism as both a broadcast domain identifier and a service instance identifier with MAC tunneling according to still another embodiment of the present invention. This embodiment is similar to that shown in FIG. 6, but instead of stacked VLAN (broadcast) and E-VLAN (service) tags in the access networks 21 & 22, in FIG. 8 the broadcast domain and service instance domain identifiers are both included in a single 20-bit E-VLAN tag that is added by u-PE device 31 (for traffic flowing left-to-right from CE device 41 to CE device 42) or u-PE device 34 (for traffic flowing right-to-left from CE device 42 to CE device 41).

Figure 9:
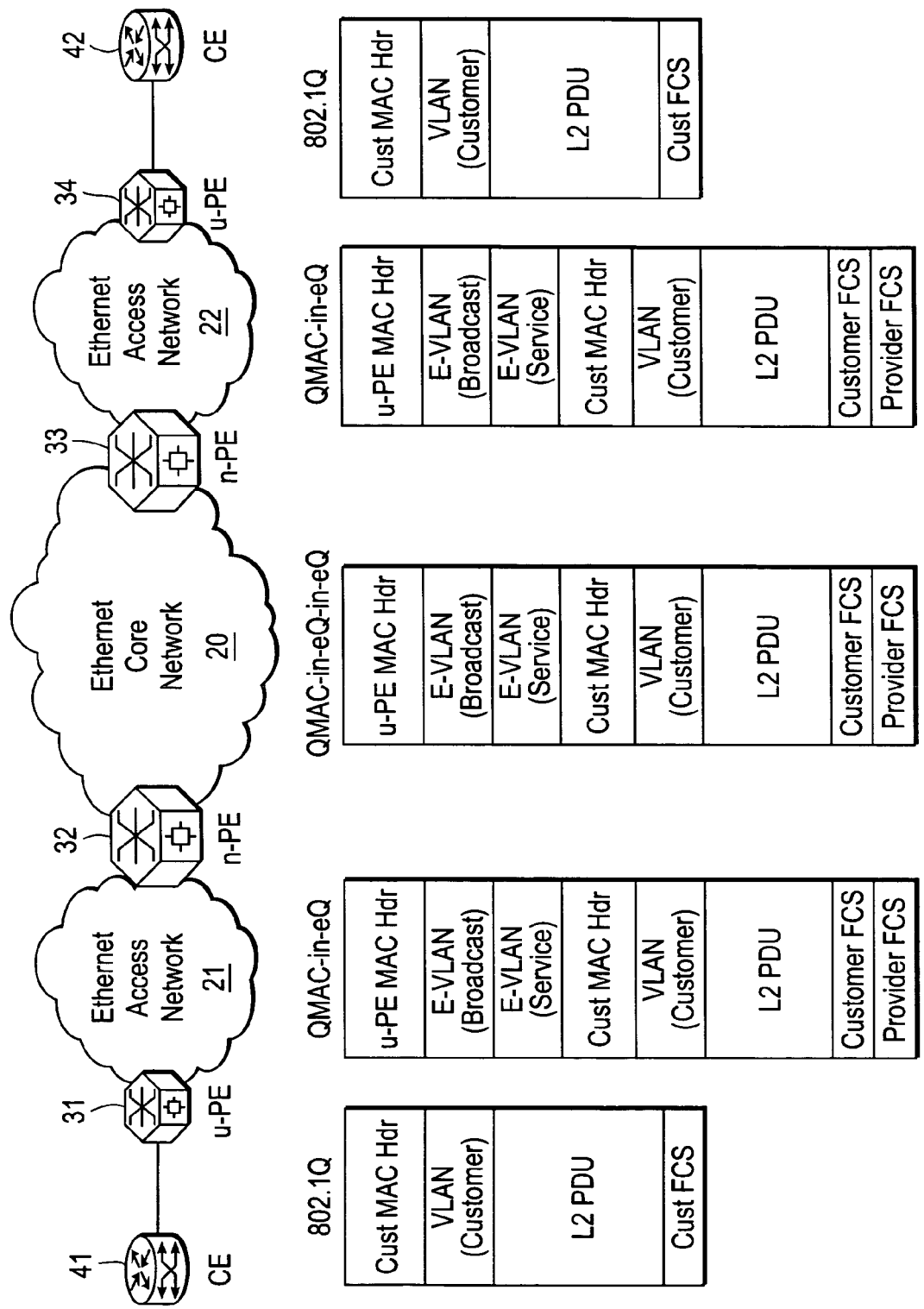
FIG. 9 illustrates the use of the extended VLAN mechanism as both a broadcast domain identifier and a service instance identifier according to yet another embodiment of the present invention.

The embodiment of FIG. 9 illustrates the use of the extended VLAN mechanism as both a broadcast domain identifier and a service instance identifier with MAC tunneling according to yet another embodiment of the present invention. This embodiment is basically the same as that shown in FIG. 8, except that instead of a single E-VLAN tag for both the broadcast domain and service instance identifiers, two stacked E-VLAN tags are utilized. The upper E-VLAN designates the broadcast domain and the lower E-VLAN identifies the service instance in the access domain. As before, the broadcast domain E-VLAN is changed by the n-PE device to define the devices and path through core network 20, while the lower E-VLAN (service) remains unchanged by n-PE devices 32 & 33.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a customer or client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of operation for a network-facing provider edge device (n-PE) of a core network associated with a service provider (SP), the method comprising:

receiving a customer frame from an access network of the SP, the customer frame having a first Virtual Local Area Network (VLAN) tag of a first predetermined bit length, the first VLAN tag including broadcast and service instance identifiers for connections across the access network; and mapping the service instance identifier of the first VLAN tag into a second VLAN tag of a second predetermined bit length greater than the first predetermined bit length;

encapsulating the customer frame with a provider address header; and stacking a third VLAN tag on the second VLAN tag, the third VLAN tag specifying a broadcast domain of the core network.

2. The processor-implemented method of claim 1 wherein the core network comprises an Ethernet core network.

3. The processor-implemented method of claim 1 wherein core network comprises a Multi-protocol label switching (MPLS)/Internet Protocol (IP) network.

4. The processor-implemented method of claim 1 wherein the first predetermined bit length is 12-bits and the second predetermined bit length is 20-bits.

5. A network-facing provider edge (n-PE) device comprising:

a port to receive a customer frame from an access network associated with a service provider (SP), the customer frame having a first Virtual Local Area Network (VLAN) tag of a first predetermined bit length, the first VLAN tag including a service instance identifier; and a processing unit that maps the service instance identifier of the first VLAN tag into a second VLAN tag of a second predetermined bit length greater than the first predetermined bit length, the processing unit being further operable to encapsulate the customer frame with a provider address header, and also to stack a third VLAN tag on the second VLAN tag, the third VLAN tag specifying a broadcast domain for connections across a core network of the SP.

6. The n-PE device of claim 5 wherein the first predetermined bit length is 12-bits and the second predetermined bit length is 20-bits.

7. A provider edge device comprising:

a plurality of ports; and means for adding a first and second Extended Virtual Local Area Network (E-VLAN) tags to a first frame received at a first port for transmission across a service provider (SP) core network, the first frame including a customer Media Access Control (MAC) header and a customer VLAN tag, the first E-VLAN tag designating a broadcast domain through an access network associated with a service provider (SP) core network, and the second E-VLAN tag identifying a service instance through the access network and the core network of the SP, the means also for encapsulating the first frame with a provider address header, the means also for dropping third and fourth E-VLAN tags of a second frame received at a second port after having traversed the core network, the first, second, third and fourth E-VLAN tags each having a bit length of at least 20 bits.

* * * * *